United States Patent
Whillock et al.

(10) Patent No.: US 8,049,812 B2
(45) Date of Patent: Nov. 1, 2011

(54) CAMERA WITH AUTO FOCUS CAPABILITY

(75) Inventors: Rand P. Whillock, North Oaks, MN (US); Gary E. Determan, Plymouth, MN (US); Jan Jelinek, Plymouth, MN (US); Vincent C. Jacobson, Eden Prairie, MN (US); Terry Ahrens, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 431 days.

(21) Appl. No.: 11/681,251

(22) Filed: Mar. 2, 2007

(65) Prior Publication Data

US 2008/0075445 A1 Mar. 27, 2008

Related U.S. Application Data

(63) Continuation-in-part of application No. 11/382,373, filed on May 9, 2006, and a continuation-in-part of application No. 11/672,108, filed on Feb. 7, 2007.

(60) Provisional application No. 60/778,770, filed on Mar. 3, 2006, provisional application No. 60/807,046, filed on Jul. 11, 2006.

(51) Int. Cl.
*G03B 13/00* (2006.01)
*H04N 5/232* (2006.01)

(52) U.S. Cl. ........................ 348/348; 348/345

(58) Field of Classification Search ........... 348/345–356
See application file for complete search history.

(56) References Cited

U.S. PATENT DOCUMENTS

| | | | |
|---|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,717,512 A | 2/1998 | Chmielewski, Jr. et al. |

(Continued)

FOREIGN PATENT DOCUMENTS

EP  0484076  5/1992

(Continued)

OTHER PUBLICATIONS

Avcibas et al., "Steganalysis Using Image Quality Metrics," IEEE Transactions on Image Processing, vol. 12, No. 2, pp. 221-229, Feb. 2003.

(Continued)

*Primary Examiner* — Anthony J Daniels
(74) *Attorney, Agent, or Firm* — Seager, Tufte & Wickhem LLC

(57) ABSTRACT

A method and apparatus for automatically focusing a camera that may rely upon ambient light for auto focusing and flash illumination for image capture. A correction factor may be determined that is based at least in part on a range between the camera and a desired subject. The camera focus may be adjusted in accordance with the correction factor prior to capturing a capture image using flash illumination.

17 Claims, 3 Drawing Sheets

U.S. PATENT DOCUMENTS

| | | |
|---|---|---|
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsuhita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 * | 6/2004 | Ford .......................... 250/201.2 |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,954,738 B2 | 10/2005 | Wang et al. |
| 6,957,341 B2 | 10/2005 | Rice et al. |
| 6,992,562 B2 | 1/2006 | Fuks et al. |
| 7,053,948 B2 | 5/2006 | Konishi |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,561 B2 | 10/2007 | Shin |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,362,210 B2 | 4/2008 | Bazakos et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,460,693 B2 | 12/2008 | Loy et al. |
| 7,471,451 B2 | 12/2008 | Dent et al. |
| 7,486,806 B2 | 2/2009 | Azuma et al. |
| 7,518,651 B2 | 4/2009 | Butterworth |
| 7,537,568 B2 | 5/2009 | Moehring |
| 7,542,945 B2 | 6/2009 | Thompson et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,804,982 B2 | 9/2010 | Howard et al. |
| 2001/0026632 A1 | 10/2001 | Tamai |
| 2001/0027116 A1 | 10/2001 | Baird |

| Publication No. | Date | Inventor |
|---|---|---|
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0080259 A1 | 6/2002 | Izumi |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0135692 A1* | 9/2002 | Fujinawa .................. 348/335 |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0152557 A1* | 10/2002 | Elberbaum ................. 8/405 |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0137597 A1* | 7/2003 | Sakamoto et al. ........... 348/371 |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessler |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |
| 2004/0190759 A1 | 9/2004 | Caldwell |
| 2004/0193893 A1 | 9/2004 | Braithwaite et al. |
| 2004/0219902 A1 | 11/2004 | Lee et al. |
| 2004/0233038 A1 | 11/2004 | Beenau et al. |
| 2004/0240711 A1 | 12/2004 | Hamza et al. |
| 2004/0252866 A1 | 12/2004 | Tisse et al. |

| | | | | | | |
|---|---|---|---|---|---|---|
| 2004/0255168 | A1 | 12/2004 | Murashita et al. | EP | 1041523 | 10/2000 |
| 2005/0008200 | A1 | 1/2005 | Azuma et al. | EP | 1126403 | 8/2001 |
| 2005/0008201 | A1 | 1/2005 | Lee et al. | EP | 1139270 | 10/2001 |
| 2005/0012817 | A1 | 1/2005 | Hampapur et al. | EP | 1237117 | 9/2002 |
| 2005/0029353 | A1 | 2/2005 | Isemura et al. | EP | 1477925 | 11/2004 |
| 2005/0052566 | A1 | 3/2005 | Kato | EP | 1635307 | 3/2006 |
| 2005/0055582 | A1 | 3/2005 | Bazakos et al. | GB | 2369205 | 5/2002 |
| 2005/0063567 | A1 | 3/2005 | Saitoh et al. | GB | 2371396 | 7/2002 |
| 2005/0084137 | A1 | 4/2005 | Kim et al. | GB | 2375913 | 11/2002 |
| 2005/0084179 | A1 | 4/2005 | Hanna et al. | GB | 2402840 | 12/2004 |
| 2005/0099288 | A1 | 5/2005 | Spitz et al. | GB | 2411980 | 9/2005 |
| 2005/0102502 | A1 | 5/2005 | Sagen | JP | 9161135 | 6/1997 |
| 2005/0110610 | A1 | 5/2005 | Bazakos et al. | JP | 9198545 | 7/1997 |
| 2005/0125258 | A1 | 6/2005 | Yellin et al. | JP | 9201348 | 8/1997 |
| 2005/0127161 | A1 | 6/2005 | Smith et al. | JP | 9147233 | 9/1997 |
| 2005/0129286 | A1 | 6/2005 | Hekimian | JP | 9234264 | 9/1997 |
| 2005/0134796 | A1 | 6/2005 | Zelvin et al. | JP | 9305765 | 11/1997 |
| 2005/0138385 | A1 | 6/2005 | Friedli et al. | JP | 9319927 | 12/1997 |
| 2005/0138387 | A1 | 6/2005 | Lam et al. | JP | 10021392 | 1/1998 |
| 2005/0146635 | A1* | 7/2005 | Hiraoka ................. 348/360 | JP | 10040386 | 2/1998 |
| 2005/0146640 | A1* | 7/2005 | Shibata ................. 348/372 | JP | 10049728 | 2/1998 |
| 2005/0151620 | A1 | 7/2005 | Neumann | JP | 10137219 | 5/1998 |
| 2005/0152583 | A1 | 7/2005 | Kondo et al. | JP | 10137221 | 5/1998 |
| 2005/0193212 | A1 | 9/2005 | Yuhara | JP | 10137222 | 5/1998 |
| 2005/0199708 | A1 | 9/2005 | Friedman | JP | 10137223 | 5/1998 |
| 2005/0206501 | A1 | 9/2005 | Farhat | JP | 10248827 | 9/1998 |
| 2005/0206502 | A1 | 9/2005 | Bernitz | JP | 10269183 | 10/1998 |
| 2005/0207614 | A1 | 9/2005 | Schonberg et al. | JP | 11047117 | 2/1999 |
| 2005/0210267 | A1 | 9/2005 | Sugano et al. | JP | 11089820 | 4/1999 |
| 2005/0210270 | A1 | 9/2005 | Rohatgi et al. | JP | 11200684 | 7/1999 |
| 2005/0210271 | A1 | 9/2005 | Chou et al. | JP | 11203478 | 7/1999 |
| 2005/0238214 | A1 | 10/2005 | Matsuda et al. | JP | 11213047 | 8/1999 |
| 2005/0240778 | A1 | 10/2005 | Saito | JP | 11339037 | 12/1999 |
| 2005/0248725 | A1 | 11/2005 | Ikoma et al. | JP | 2000005149 | 1/2000 |
| 2005/0249385 | A1 | 11/2005 | Kondo et al. | JP | 2000005150 | 1/2000 |
| 2005/0255840 | A1 | 11/2005 | Markham | JP | 2000011163 | 1/2000 |
| 2006/0093190 | A1 | 5/2006 | Cheng et al. | JP | 2000023946 | 1/2000 |
| 2006/0147094 | A1 | 7/2006 | Yoo | JP | 2000083930 | 3/2000 |
| 2006/0165266 | A1 | 7/2006 | Hamza | JP | 2000102510 | 4/2000 |
| 2006/0274919 | A1 | 12/2006 | LoIacono et al. | JP | 2000102524 | 4/2000 |
| 2006/0289772 | A1* | 12/2006 | Johnson et al. ......... 250/370.08 | JP | 2000105830 | 4/2000 |
| 2007/0036397 | A1 | 2/2007 | Hamza | JP | 2000107156 | 4/2000 |
| 2007/0140531 | A1 | 6/2007 | Hamza | JP | 2000139878 | 5/2000 |
| 2007/0160266 | A1 | 7/2007 | Jones et al. | JP | 2000155863 | 6/2000 |
| 2007/0189582 | A1 | 8/2007 | Hamza et al. | JP | 2000182050 | 6/2000 |
| 2007/0206840 | A1 | 9/2007 | Jacobson | JP | 2000185031 | 7/2000 |
| 2007/0211924 | A1 | 9/2007 | Hamza | JP | 2000194972 | 7/2000 |
| 2007/0274570 | A1 | 11/2007 | Hamza | JP | 2000237167 | 9/2000 |
| 2007/0274571 | A1 | 11/2007 | Hamza | JP | 2000242788 | 9/2000 |
| 2007/0286590 | A1 | 12/2007 | Terashima | JP | 2000259817 | 9/2000 |
| 2008/0005578 | A1 | 1/2008 | Shafir | JP | 2000356059 | 12/2000 |
| 2008/0036901 | A1* | 2/2008 | Shinohara et al. ............ 348/349 | JP | 2000357232 | 12/2000 |
| 2008/0075334 | A1 | 3/2008 | Determan et al. | JP | 2001005948 | 1/2001 |
| 2008/0075441 | A1 | 3/2008 | Jelinek et al. | JP | 2001067399 | 3/2001 |
| 2008/0104415 | A1 | 5/2008 | Palti-Wasserman et al. | JP | 2001101429 | 4/2001 |
| 2008/0148030 | A1 | 6/2008 | Goffin | JP | 2001167275 | 6/2001 |
| 2008/0211347 | A1 | 9/2008 | Wright et al. | JP | 2001222661 | 8/2001 |
| 2008/0252412 | A1 | 10/2008 | Larsson et al. | JP | 2001292981 | 10/2001 |
| 2008/0267456 | A1 | 10/2008 | Anderson | JP | 2001297177 | 10/2001 |
| 2009/0046899 | A1 | 2/2009 | Northcott et al. | JP | 2001358987 | 12/2001 |
| 2009/0092283 | A1 | 4/2009 | Whillock et al. | JP | 2002119477 | 4/2002 |
| 2009/0316993 | A1 | 12/2009 | Brasnett et al. | JP | 2002133415 | 5/2002 |
| 2010/0002913 | A1 | 1/2010 | Hamza | JP | 2002153444 | 5/2002 |
| 2010/0033677 | A1 | 2/2010 | Jelinek | JP | 2002153445 | 5/2002 |
| 2010/0034529 | A1 | 2/2010 | Jelinek | JP | 2002260071 | 9/2002 |
| 2010/0142765 | A1 | 6/2010 | Hamza | JP | 2002271689 | 9/2002 |
| 2010/0182440 | A1 | 7/2010 | McCloskey | JP | 2002286650 | 10/2002 |
| 2010/0239119 | A1 | 9/2010 | Bazakos et al. | JP | 2002312772 | 10/2002 |
| | | | | JP | 2002329204 | 11/2002 |
| | FOREIGN PATENT DOCUMENTS | | | JP | 2003006628 | 1/2003 |
| EP | | 0593386 | 4/1994 | JP | 2003036434 | 2/2003 |
| EP | | 0878780 | 11/1998 | JP | 2003108720 | 4/2003 |
| EP | | 0899680 | 3/1999 | JP | 2003108983 | 4/2003 |
| EP | | 0910986 | 4/1999 | JP | 2003132355 | 5/2003 |
| EP | | 0962894 | 12/1999 | JP | 2003150942 | 5/2003 |
| EP | | 1018297 | 7/2000 | JP | 2003153880 | 5/2003 |
| EP | | 1024463 | 8/2000 | JP | 2003242125 | 8/2003 |
| EP | | 1028398 | 8/2000 | JP | 2003271565 | 9/2003 |
| EP | | 1041506 | 10/2000 | JP | 2003271940 | 9/2003 |

| | | |
|---|---|---|
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | 02091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Daugman, "How Iris Recognition Works," IEEE 2002 International Conference on Image Processing, vol. I of III, 6 pages, Sep. 22-25, 2002.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

Jalaja et al., "Texture Element Feature Characterizations for CBIR," IEEE, pp. 733-736, 2005.

Kalka et al., "Image Quality Assessment for Iris Biometric," Proc. Of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Sony, "Network Color Camera, SNC-RZ30N (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Du et al., "A One-Dimensional Approach for Iris Identification," 11 pages, prior to Jan. 25, 2006.

http://www.newscientisttech.com/article/dn11110-invention-covert-iris-sc, "Invention: Covert Iris Scanner," 3 pages, printed Feb. 8, 2007.

Huang et al., "Iris Model Based On Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Ma et al., "Personal Identification Based On Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Sun et al., "Robust Encoding of Local Ordinal Measures: A General Framework of Iris Recognition," 13 pages, prior to Jan. 25, 2006.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30, 2011.

Freeboy, "Adaptive Optics Speeds Up Airport Immigration," Optics.org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

* cited by examiner

CAMERA WITH AUTO FOCUS CAPABILITY

This application claims the benefit of U.S. Provisional Application No. 60/778,770, filed Mar. 3, 2006, and U.S. Provisional Application No. 60/807,046, filed Jul. 11, 2006. This application is also a continuation-in-part of U.S. patent application Ser. No. 11/382,373, filed May 9, 2006, and a continuation-in-part of U.S. patent application Ser. No. 11/672,108, filed Feb. 7, 2007. Each of these applications is hereby incorporated by reference.

RELATED APPLICATIONS

This application is related to U.S. patent application Ser. No. 10/979,129, filed Nov. 3, 2004, U.S. patent application Ser. No. 10/655,124, filed Sep. 5, 2003, now U.S. Pat. No. 7,183,895, U.S. patent application Ser. No. 11/275,703, filed Jan. 25, 2006, U.S. Provisional Application No. 60/647,270, filed Jan. 26, 2005, U.S. patent application Ser. No. 11/043,366, filed Jan. 26, 2005, U.S. patent application Ser. No. 11/372,854, filed Mar. 10, 2006, and U.S. patent application Ser. No. 11/675,424, filed Feb. 15, 2007, all of which are hereby incorporated by reference.

The government may have rights in the invention.

TECHNICAL FIELD

The invention pertains generally to cameras and more particularly to cameras and camera systems in which the camera can be focused using light whose spectrum is different from that used for image capture.

BACKGROUND

In many instances, flash illumination of a subject is used to obtain a well-exposed image. However, as flash illumination typically has a very short flash duration, it may not be possible for a camera to auto focus properly during the flash discharge event, and hence the camera is typically auto focused prior to image capture using ambient light. If, however, the ambient light spectrum used for auto focus differs from the flash light spectrum that is used for image capture, the camera focus that is obtained during auto focus may not be entirely in focus for the captured image. A need exists, therefore, for structure and methods that permit a camera to be auto focused using ambient light or some spectral subset thereof, while also providing a proper focus under a flash spectrum or some spectral subset thereof, particularly when the ambient light spectrum that is used for auto focus differs from the flash spectrum that is used for image capture.

SUMMARY

The invention relates generally to structure and to methods that permit a camera to be auto focused using ambient light or some spectral subset thereof, while also providing a proper focus under a flash spectrum or some spectral subset thereof. This may be accomplished even when the ambient light spectrum that is used for auto focus differs from the flash spectrum that is used for image capture.

In some cases, ambient light may be used for auto focusing the camera, and light from a flash discharge may be used for image capture. Ambient light may include the light that is in or around a subject of interest on a persistent or substantially persistent basis. Ambient light may be produced by man made light sources in the vicinity of the camera, or natural light sources such as the sun. The ambient light used for auto focus may be in the visible spectrum, or some other spectrum as desired. In some instances, auto focusing may rely on a selected spectral subset of the ambient light, but this is not required in all embodiments.

A correction factor may be generated that represents a change in the camera auto focus to correct for the different wavelength(s) used for image capture. In some instances, the wavelength(s) used for image capture may be in the infrared spectrum, and the wavelength(s) used for auto focus may be in the visible spectrum, but this is not required in all embodiments. The correction factor may be applied to the camera focus, and the new corrected camera focus may be used during image capture.

BRIEF DESCRIPTION OF THE FIGURES

The above summary of the present invention is not intended to describe each disclosed embodiment or every implementation of the present invention. The Figures, Detailed Description and Examples which follow more particularly exemplify these embodiments.

Figure 1:
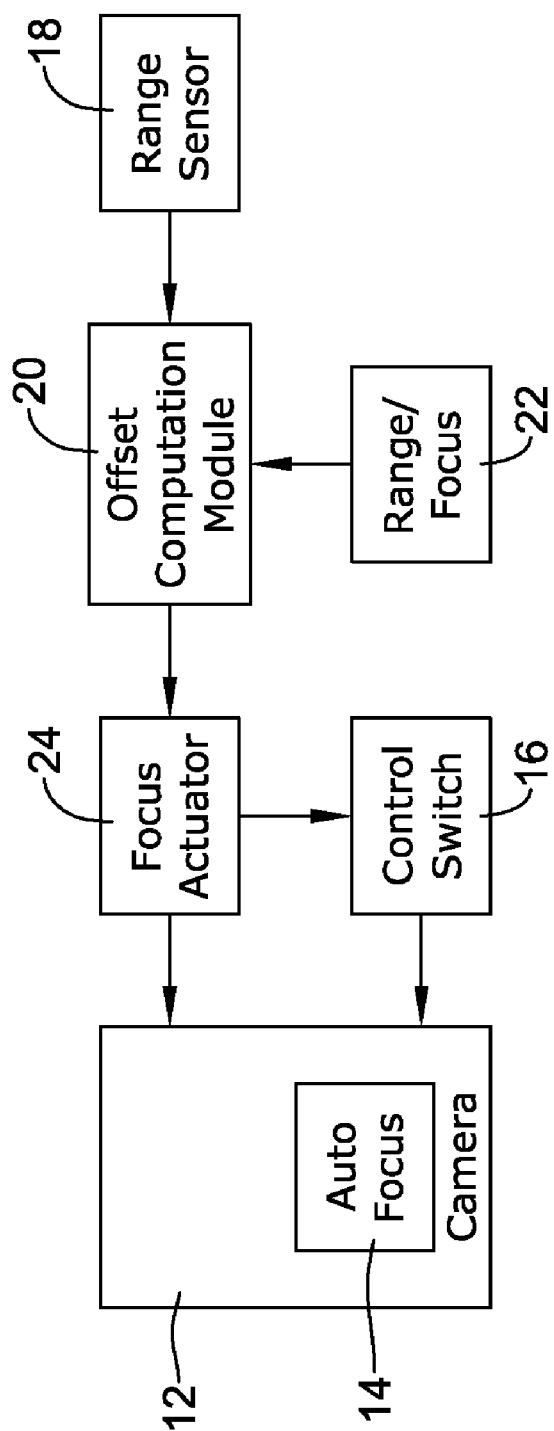
FIG. 1 is a diagrammatic illustration of an exemplary camera system in accordance with an example of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

FIG. 1 provides an illustrative but non-limiting example of a camera system 10 that includes a camera generally shown at 12. It is understood that, in the illustrative embodiment, the term "camera" denotes both a camera head that houses an optical sensor with its support electronics as well as the camera optics. In some cases, camera 12 may be capable of capturing images in more than one spectra. For example, camera 12 may be capable of capturing images in the visible light spectrum and/or other light spectra such as the infrared and/or ultraviolet spectra. A variety of cameras are known that are capable of capturing images of differing wavelengths, including cameras that are capable of capturing images in the visible spectrum and the infrared spectrum. While infrared light is used here as an example, it is contemplated that the camera 12 may be capable of capturing images in other wavelength bands, if desired.

While camera 12 is diagrammatically illustrated as a single camera, it will be recognized that in some cases, camera 12 may instead be a compilation of two (or even more) cameras that share a common optical path, i.e., one or more mirrors, beam splitters or the like could be employed to provide each of two or more cameras (or sensors/sensor arrays) with the same or essentially the same incoming image structure. For example, camera 12 could include a first camera that is sensitive only to visible light and a second camera that is sensitive only to infrared (or other) light. In some cases, and in one example, each camera could include a filter or the like that blocks out or otherwise reduces or prevents visible light from reaching the infrared camera and/or reduces or prevents infrared light from reaching the visible camera.

In some instances, camera 12 may include an auto focus mode 14, shown generically as block 14. The auto focus mode 14 may be configured to automatically focus camera 12 using at least a portion of the ambient light spectrum. In some cases, ambient light may be considered as being background, or persistent, light from at least one of natural and man-made sources. In many cases, and not meant to be limiting in anyway, ambient light may include all or essentially all of the visible light spectrum, or only a small portion thereof. The auto focus mode 14 may, in some circumstances, be considered as an internal focus mode, as the elements which act together to form the auto focus mode 14 are often located internal to the camera 12. These elements may include one or more of a motor, a controller and a position sensor, and are often disposed internal to camera 12.

Camera 12 may also include an external focus mode in which an individual or an actuator can manipulate the focus of camera 12, often from an exterior of the camera, although this is not expressly shown in camera 12. In some cases, camera system 10 may include an external focus/internal focus control switch 16 that permits switching camera 12 from an internal auto focus mode (auto focus mode 14) to an external focus mode and/or from an external focus mode to an internal auto focus mode, as desired. Control switch 16 may be a mechanical switch, an electrical switch or may even represent a function provided by an electronic controller that may, if desired, be provided to control various functions and features of camera 12. The use of the terms "internal" and "external" as used herein merely describe an illustrative embodiment of the camera 12. It must be recognized that the various recited features do not have to be "internal" or "external" to the camera 12, and thus these terms should not be interpreted as limiting in any way. More generally, the camera 12 may be considered to include an auto focus mode and a non-auto focus mode.

As alluded to above, auto focusing performed using ambient light or a spectral subset thereof may not provide a clearly focused image if the image capture is performed using a different light spectrum, such as an infrared light spectrum produced by, for example, a flash discharge. In some instances, auto focus mode 14 may rely at least in part on visible light (e.g. a green band of light) within the ambient light spectrum, while the image capture may primarily rely on infrared light. It will be recognized that two spectra of light, such as infrared light and visible light, focus differently due in part to the different refraction of the light caused by the optical elements (e.g. lenses).

To help correct for this, and in some cases, camera system 10 may include a range sensor 18 that may be configured to determine a distance between camera 12 and a desired subject (not illustrated). Any of a variety of different sensors may be used as range sensor 18. In some instances, range sensor 18 may be an optical sensor such as a laser range finder or a scanning laser. In some cases, range sensor 18 may be an acoustical sensor such as an acoustic ranger. If desired, range sensor 18 may instead represent a photographic or image processing technique such as stereo imagery or even a motion-based method. In some cases, the range of the subject may be determined from the setting of the optical system (which may be set in the auto focus mode) when the subject is "in focus" using ambient light. In some cases, such techniques may be carried out by the aforementioned controller.

In any case, a signal related to the range of the subject from the camera may be sent to an offset computation module 20, which may be configured to calculate or otherwise determine an offset value that can be used to correct the auto focus position of camera 12. Offset computation module 20 may rely upon a range/focus tables or calculation module 22 to calculate or look up an offset value that is based at least in part on a subject range (e.g. distance between camera 12 and a desired subject) that is provided by range sensor 18 or otherwise determined. In some instances, range/focus tables or calculation module 22 may be incorporated into offset computation module 20, if desired.

In some cases, an offset value may be calculated via a formula or by referencing a look up table. The offset value may represent a difference in focal length, or in some cases a focus lens servo set point value correction, between the light spectrum relied upon for auto focusing and the light spectrum that will be used for image capture. For example, the offset value may provide a correction to account for using visible light (or a spectral subset thereof) to auto focus and using infrared light for image capture.

Once an offset value has been calculated or otherwise determined, camera 12 may be adjusted from the auto focus position to compensate for the aforementioned difference in focal length. In some cases, a focus actuator 24 may be used to adjust the focus of camera 12 relative to the auto focus position by, for example, rotating a focus ring of camera 12. Prior to adjusting the focus of camera 12, it may be desirable to switch camera 12 from auto focus mode 14 (FIG. 1) to the non-auto focus mode by actuating control switch 16. Once the focus of camera 12 has been adjusted to provide for a focused infrared image, camera 12 may be actuated to capture an infrared image as desired.

In some cases, external or non-auto focusing or adjustment of camera 12 may be carried out mechanically. In some instances, it is contemplated that the adjustment made to compensate for focal length differences may be made by providing appropriate commands to the focus lens adjustment servo, motor or motors that are involved in auto focusing camera 12. When so provided, the controller referenced above (not illustrated) may accept an offset value from offset computation module 20 and may provide appropriate commands to the focusing motor or motors within camera 12. It will be recognized that such a controller may also encompass the function of one or more of control switch 16, offset computation module 20 and/or range/focus tables or calculation module 22. As can be seen, and in this embodiment, the external or non-auto focus mode may be actually located or implemented primarily "internally" to the camera 12.

Figure 2:
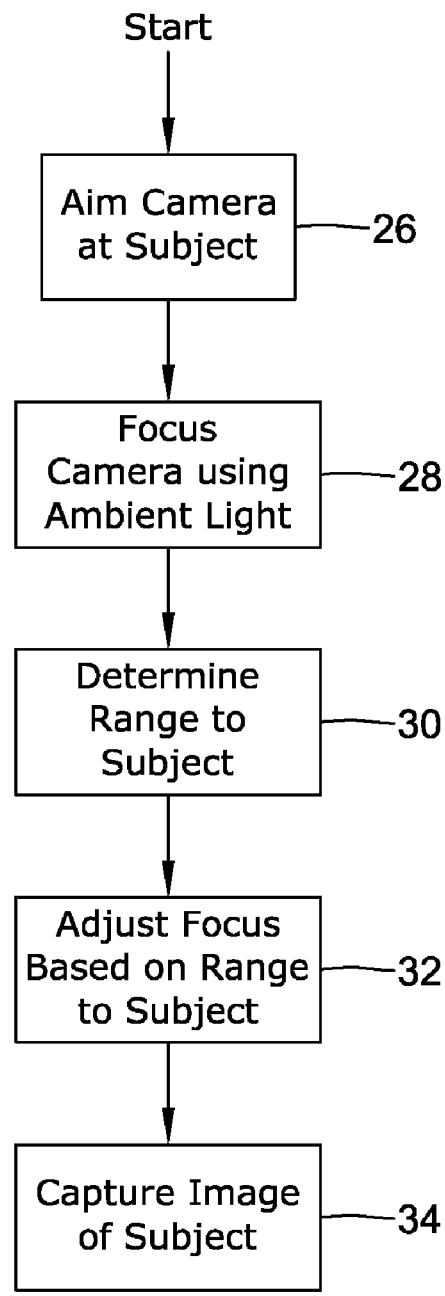
FIG. 2 is a flow diagram illustrating a method that may be carried out using the camera system of FIG. 1.

FIG. 2 is a flow diagram showing an illustrative but non-limiting method that may be carried out using camera system 10 (FIG. 1). At block 26, a camera such as camera 12 (FIG. 1) may be aimed at a subject. The subject may be any desired subject. In some cases, the subject may be a stationary or moving human subject that may or may not be aware that they are being photographed. The camera 12 may be manually aimed at the subject, i.e., camera 12 may be manually aimed at the subject by a person holding camera 12. In other instances, camera 12 (and the additional components making up camera system 10) may be mounted to a mechanical positioner. A mechanical positioner may accept aiming commands from another camera or system, and may be used to aim camera system 10 as desired.

Control then passes to block 28, at which camera system 10 (FIG. 1) focuses camera 12. In some cases, camera 12 may be focused using ambient light. In some cases, camera 12 may engage its auto focus mode 14 (FIG. 1) in order to automatically focus camera 12 on a desired subject. At block 30, the range of the subject is determined. This may be accomplished using range sensor 18 (FIG. 1). Alternatively, or in addition, it is contemplated that the range of the subject may be determined from the setting of the optical system (which may be set in the auto focus mode) when the subject is "in focus" using the desired ambient light spectra. The focus is adjusted relative to the auto focus position at block 32 in response to the subject range. As noted above, this may involve using switch 16 to switch camera 12 from auto focus mode 14 to a non-auto focus mode, and then rotating a focus ring as instructed by focus actuator 24 or commanding the focus lens servo to the same effect. Then, at block 34, camera 12 captures an image of the subject. An image may be captured using ambient light, flash illumination, or any combination thereof, as desired. In some cases, an image is captured using infrared light.

As illustrated, in FIG. 2, the step of determining the range to the subject (block 30) is shown as occurring after camera 12 is focused using ambient light (block 28). It will be recognized that the step of determining the subject range may occur at any time. In some cases, the subject range may be determined before focusing camera 12. If desired, the subject range may be determined at the same time or at substantially the same time as focusing camera 12. In some instances, the step of determining the subject range may occur after focusing camera 12.

Figure 3:
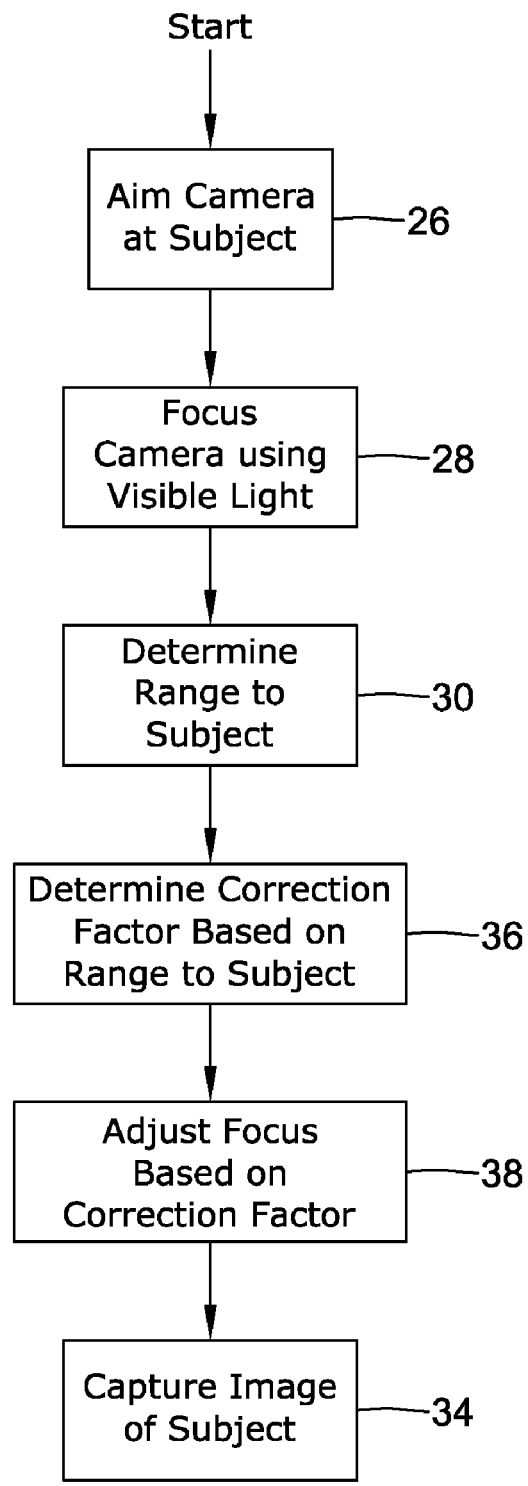
FIG. 3 is a flow diagram illustrating a method that may be carried out using the camera system of FIG. 1.

FIG. 3 shows a flow diagram of an illustrative but non-limiting method that may be carried out using camera system 10 (FIG. 1). At block 26, a camera such as camera 12 (FIG. 1) may be aimed at any desired subject as described above. Control passes to block 28, at which camera system 10 (FIG. 1) focuses camera 12 using ambient light. In some cases, camera 12 may engage its auto focus mode 16 (FIG. 1) in order to focus camera 12 on a desired subject. At block 30, the range of the desired subject is determined. This may be accomplished by, for example, using a range sensor 18 (FIG. 1). Alternatively, or in addition, it is contemplated that the range of the subject may be determined from the setting of the optical system (which may be set in the auto focus mode) when the subject is "in focus" using ambient light. As noted above, the subject range may be determined at any time, i.e., before, during or after focusing camera 12 at block 28.

Control then passes to block 36, where a correction factor is determined based at least in part by the determined subject range. As discussed above, the correction factor may represent a difference in focal length between ambient light that may be used for auto focusing, and another wavelength(s) such as infrared light that may be used for imaging. At block 38, the focus is adjusted in accordance with the correction factor determined at block 36. This may involve using switch 16 to switch camera 12 from auto focus mode 14 (FIG. 1) to a non-auto focus mode and then rotating a focus ring 34 as, for example, may be done by focus actuator 24. Then, at block 34, camera 12 captures an image of the subject using flash illumination, if desired.

As illustrated, in FIG. 3, the step of determining the range to the subject (block 30) is shown as occurring after camera 12 is auto focused (block 28). It will be recognized that the step of determining the subject range may occur at any time, i.e., before, during or after focusing camera 12. Moreover, the step of determining a correction factor based on the subject range (block 38) may occur at any time subsequent to range sensor 18 (FIG. 1) determining the sensor range.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A camera system comprising:
   a camera having a lens, the camera having an auto focus mode, wherein the auto focus mode relies upon a first wavelength or first range of wavelengths of light to automatically focus the camera to a first focus setting;
   a range sensor that is configured to determine a range between a subject and the camera;
   an offset computation module that determines an offset value based at least in part on the range between the subject and the camera determined by the range sensor, the offset value being effective for correcting focus of the camera from the first focus setting at the first wavelength or first range of wavelengths of light to a second focus setting at a second wavelength or second range of wavelengths of light; and
   a focus actuator configured to adjust a focus setting of the camera in accordance with the offset value to the second focus setting, the second focus setting being used in capturing an image of the subject using the second wavelength or second range of wavelengths of light.

2. The camera system of claim 1, wherein the camera also has a non auto focus mode for the lens, and a control switch that is configured to switch the camera between the auto focus mode and the non-auto focus mode.

3. The camera system of claim 1, wherein the auto focus mode relies upon ambient light to automatically focus the camera to the first focus setting.

4. The camera system of claim 3, wherein the camera is configured to take pictures of the subject using infrared light.

5. A method of capturing an image of a subject, the method comprising steps of:
   pointing a camera at the subject;
   achieving focus of the camera on the subject at a first focus setting using ambient light;
   determining a range to the subject;
   adjusting the achieved focus of the camera from the first focus setting to a second focus setting based at least in part on the range to the subject determined in the determining step; and
   capturing an infrared image of the subject using the second focus setting.

6. The method of claim 5, wherein achieving focus of the camera at the first focus setting comprises engaging an auto focus mode of the camera.

7. The method of claim 5, wherein adjusting the achieved focus of the camera from the first focus setting to the second focus setting comprises actuating an actuator.

8. The method of claim 5, wherein adjusting the achieved focus of the camera from the first focus setting to the second focus setting comprises determining a correction factor based on the range to the subject, and then actuating an actuator to adjust the focus of the camera based on the correction factor.

9. The method of claim 5, wherein determining the range to the subject is done before achieving focus of the camera at the first focus setting.

10. The method of claim 5, wherein determining the range to the subject is done while achieving focus of the camera at the first focus setting.

11. The method of claim 5, wherein determining the range to the subject is done after achieving focus of the camera at the first focus setting.

12. The method of claim 8, wherein calculating a correction factor is done at a time after determining the range to the subject.

13. A method of focusing a camera having ambient and flash illumination capability, the method comprising the steps of:
pointing the camera at a subject;
achieving a focus of the camera on the subject using ambient light, resulting in a first focus setting;
determining a subject range between the camera and the subject;
determining a correction factor based at least in part on the subject range determined in the determining step; and
adjusting the camera focus from the first focus setting to a second focus setting based on the correction factor, and using the second focus setting to capture an image of the subject using a flash illumination.

14. The method of claim 13, wherein capturing an image of the subject using flash illumination comprises capturing an infrared image of the subject.

15. The method of claim 13, wherein adjusting the camera focus from the first focus setting to the second focus setting comprises activating a non-auto focus mode and then adjusting the focus.

16. The method of claim 13, wherein determining a subject range comprises using a range sensor.

17. The method of claim 13, wherein determining a subject range comprises using a photographic analysis technique.

* * * * *